United States Patent
Shimasaki

(10) Patent No.: US 8,817,298 B2
(45) Date of Patent: Aug. 26, 2014

(54) IMAGE FORMING APPARATUS AND IMAGE FORMING SYSTEM

(75) Inventor: Ikuo Shimasaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 157 days.

(21) Appl. No.: 13/013,604

(22) Filed: Jan. 25, 2011

(65) Prior Publication Data

US 2011/0181904 A1 Jul. 28, 2011

(30) Foreign Application Priority Data

Jan. 27, 2010 (JP) ................................. 2010-015310

(51) Int. Cl.
G06F 3/12 (2006.01)
G06F 15/00 (2006.01)

(52) U.S. Cl.
USPC .......................... 358/1.15; 358/1.14; 358/1.16

(58) Field of Classification Search
USPC ....................................................... 358/1.15
See application file for complete search history.

(56) References Cited

U.S. PATENT DOCUMENTS

| 2004/0239992 A1* | 12/2004 | Kawai et al. ................. 358/1.15 |
| 2004/0246512 A1 | 12/2004 | Miyamoto |
| 2008/0246989 A1* | 10/2008 | Konuma ....................... 358/1.15 |
| 2010/0118340 A1* | 5/2010 | Yamada ....................... 358/1.15 |

FOREIGN PATENT DOCUMENTS

| JP | 07-319646 A | | 12/1995 |
| JP | 07319646 A | * | 12/1995 |
| JP | 2003-208292 A | | 7/2003 |
| JP | 2003-248576 A | | 9/2003 |
| JP | 2003-260857 A | | 9/2003 |
| JP | 2003309684 A | | 10/2003 |
| JP | 2004-330639 A | | 11/2004 |
| JP | 2006-237688 A | | 9/2006 |

* cited by examiner

Primary Examiner — Huo Long Chen
(74) Attorney, Agent, or Firm — Edwards Wildman Palmer LLP; David G. Conlin; George N. Chaclas

(57) ABSTRACT

When data for printing and an authentication code are inputted, a CPU of a printer calculates a number of sheets to be used based on the data for printing. The CPU adds the calculated number of sheets to be used to the management table, based on the inputted authentication code, and rearranges the management table so that a user with a smaller number of used sheets is in a higher place. The CPU executes print processing using the inputted data for printing. The CPU acquires a display name, ranking, and the number of used sheets corresponding to the inputted authentication code from the management table in an RAM to transmit to information technology equipment.

7 Claims, 9 Drawing Sheets

FIG.3

SEP. 2009

| RANKING | USER NAME | DISPLAY NAME | E-mail | AUTHENTICATION CODE | NO. OF USED SHEETS | LATEST USE TIME |
|---|---|---|---|---|---|---|
| 1 | Uchida | 内田 | uchida@abc.abc | id0009 | 0 | 2009/8/23 |
| 2 | Takahashi | 高橋 | takahashi@abc.abc | id0008 | 5 | 2009/9/24 |
| 3 | Yabe | 矢部 | yabe@abc.abc | id0007 | 12 | 2009/9/4 |
| 4 | Suzuki | 鈴木 | suzuki@abc.abc | id0001 | 20 | 2009/9/23 |
| 5 | Saito | 斉藤 | saito@abc.abc | id0003 | 25 | 2009/9/20 |
| 6 | Sato | 佐藤 | sato@abc.abc | id0004 | 43 | 2009/9/23 |
| 7 | Tanaka | 田中 | tanaka@abc.abc | id0002 | 55 | 2009/9/24 |
| 8 | Nakamura | 中村 | nakamura@abc.abc | id0005 | 125 | 2009/9/22 |
| 9 | Okamura | 岡村 | okamura@abc.abc | id0006 | 223 | 2009/9/12 |
| 10 | Yamada | 山田 | yamada@abc.abc | id0010 | 458 | 2009/9/20 |
| 11 | .. | .. | .. | .. | .. | .. |

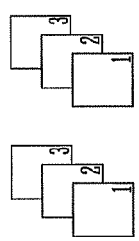

IMAGE FORMING APPARATUS AND IMAGE FORMING SYSTEM

CROSS REFERENCE

This Nonprovisional application claims priority under 35 U.S.C. §119(a) on Patent Application No. 2010-015310 filed in Japan on Jan. 27, 2010, the entire contents of which are hereby incorporated by reference.

BACKGROUND OF THE INVENTION

The present invention relates to an image forming apparatus and an image forming system that notify a contribution degree to natural resource saving to thereby encourage contribution to the natural source saving.

Conventionally, there have been proposed various image forming apparatuses designed to contribute to the natural source saving, as disclosed in Japanese Patent Application Laid-Open No. 2003-208292, for example.

In a method of managing the number of printed sheets in the above-mentioned image forming apparatus, the number of used sheets of a user in a period selected by the user (on a monthly basis, on a weekly basis, on a daily basis) is displayed, and when the number of used sheets of the user exceeds a predetermined upper limit value, warning display is performed.

However, in the conventional method of managing the number of printed sheets, the user can know the number of used sheets by himself or herself, but does not know a level of the number of used sheets by himself or herself in comparison with those of other users.

An object of the present invention is to provide an image forming apparatus and an image forming system capable of encouraging contribution to natural source saving by reduction in the sheets to be used by a user knowing a level of the number of used sheets by himself or herself in comparison with other users.

SUMMARY OF THE INVENTION

An image forming apparatus of the present invention performs image formation on paper, based on data for printing transmitted from a plurality of information technology equipment such as personal computers. The image forming apparatus calculates a number of sheets to be used of paper necessary for the image formation of the data for printing received from each of the information technology equipment, and accumulatively adds the calculated number of sheets to be used for each user of each of the information technology equipment to update ranking of a number of used sheets of each user and notify the ranking to each user.

BRIEF DESCRIPTION OF THE DRAWINGS

FIG. 3 is a diagram showing one example of a management table;

FIG. 4 is a diagram showing one example of a print processing window;

DETAILED DESCRIPTION OF THE INVENTION

Figure 1:
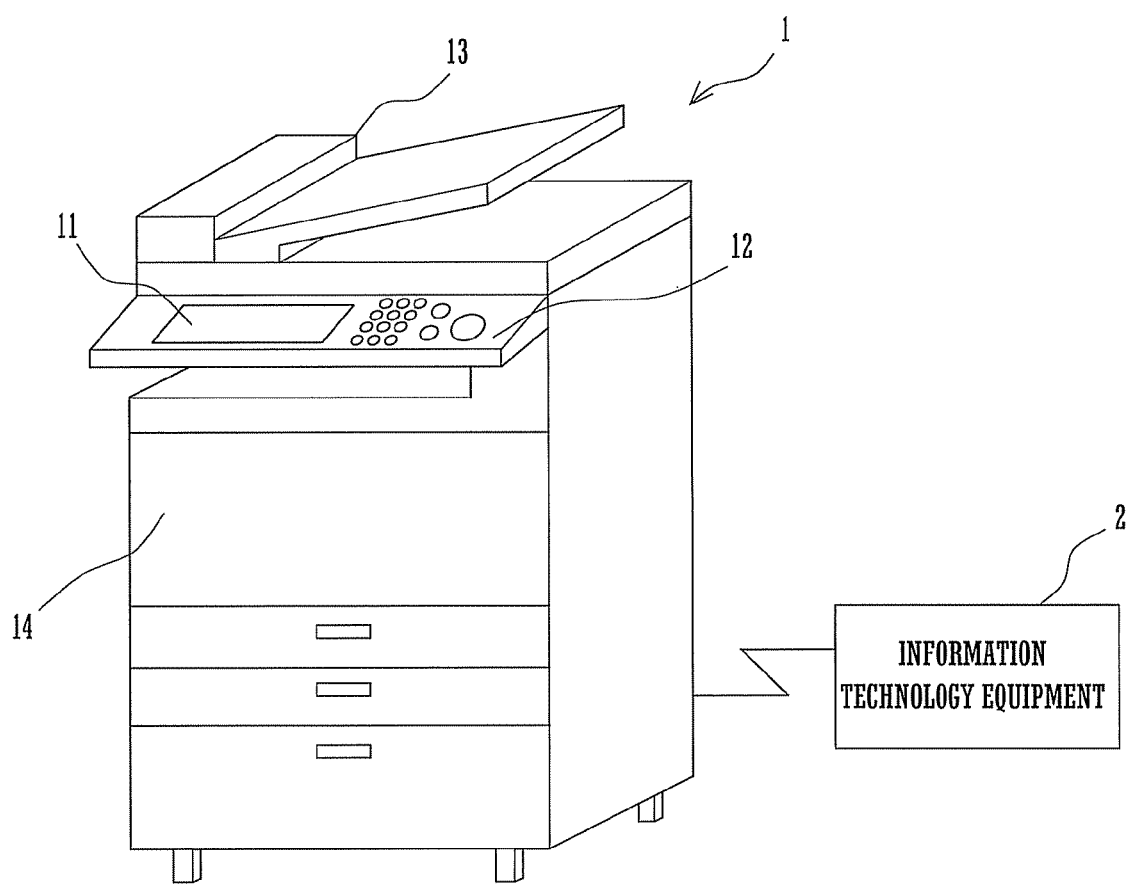
FIG. 1 is a diagram showing an outer appearance of an image forming apparatus.

As shown in FIG. 1, a printer 1, which is an image forming apparatus according to an embodiment of the present invention, is connected to information technology equipment 2 such as a personal computer through a USB or a network. The number of the information technology equipment 2 connected to the printer 1 is not limited to one.

The printer 1 includes a display unit 11, an operation panel 12, an automatic original reading unit 13, and an image forming unit 14. The display unit 11 displays a progress status of print processing. The operation panel 12 receives input operation of start of the print processing and various types of setting relating to the print processing such as print copies. The automatic original reading unit 13 generates image data from an image read from an original. The image forming unit 14 performs the print processing based on the image data on paper. The display unit 11 may include a touch panel to receive the input operation of the start of the print processing and the various types of setting relating to the print processing in place of the operation panel 12 or together with the operation panel 12.

The printer 1 is, as an example, a multifunction machine that performs electrophotographic-type print processing. The print processing executed by the printer 1 may be of an ink-jet type or of another type, or the type can be selected from a plurality of types.

Figure 2:
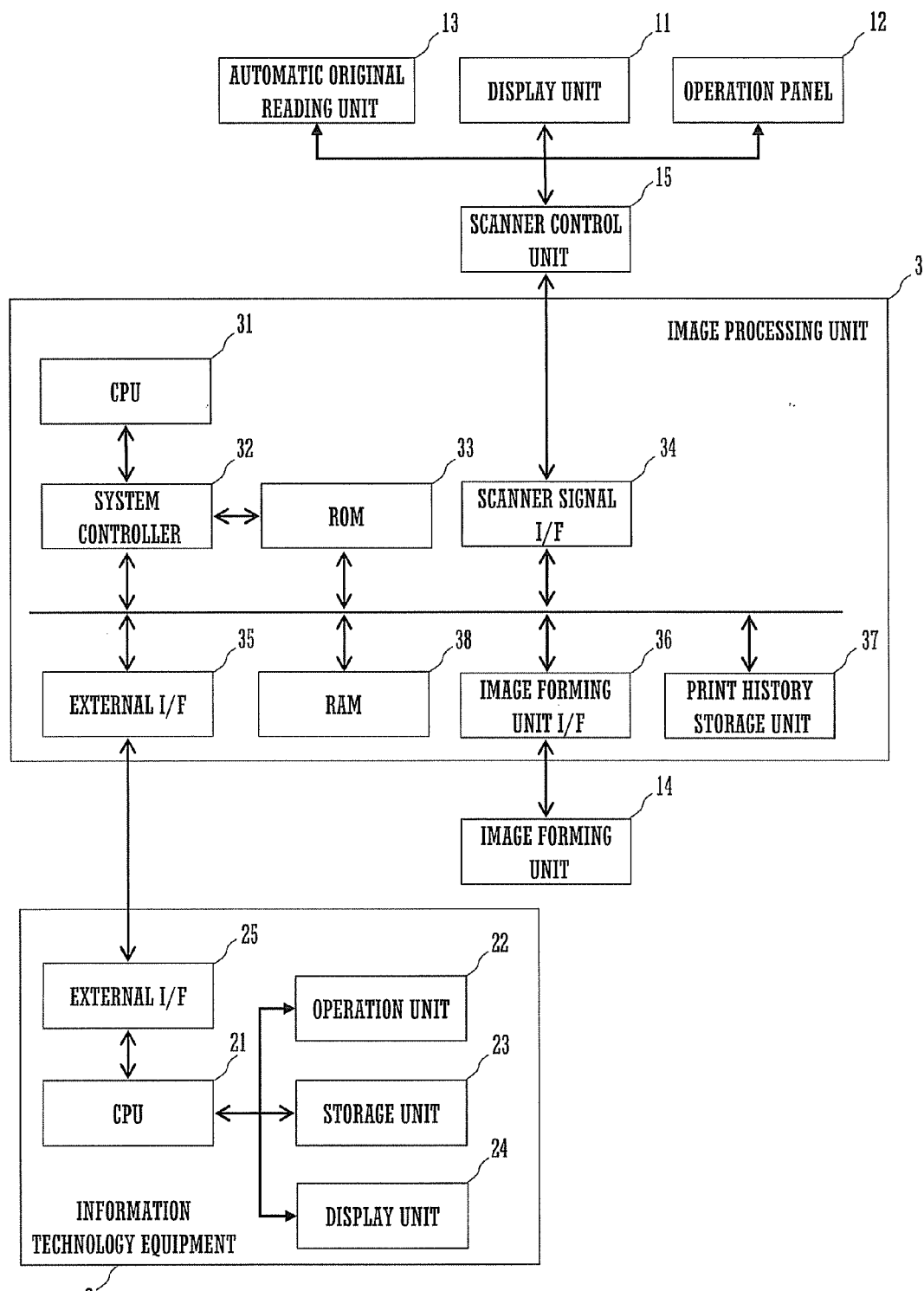
FIG. 2 is a block diagram showing the image forming apparatus and information technology equipment.

As shown in FIG. 2, the printer 1 further includes a scanner control unit 15, and an image processing unit 3. The scanner control unit 15 is connected to a scanner signal I/F 34 of the image processing unit 3 to control the display unit 11, the operation panel 12 and the automatic original reading unit 13. The scanner control unit 15 outputs, to the scanner signal I/F 34, setting information indicating various setting contents relating to the print processing from the display unit 11 and the operation panel 12, and the image data from the automatic original reading unit 13. The scanner control unit 15 makes control so as to display the progress status of the print processing on the display unit 11.

The image processing unit 3 includes a CPU 31, a system controller 32, a ROM 33, interfaces 34 to 36, a print history storage unit 37, and a RAM 38.

The CPU 31 is connected to the ROM 33, the scanner signal I/F 34, the external I/F 35, the image forming unit I/F 36, the print history storage unit 37 and the RAM 38 through the system controller 32.

The ROM 33 stores various programs that the CPU 31 executes. The various programs include a management program to manage, for example, a number of used sheets of each user, ranking of the user and the like, and to notify the same. The CPU 31 activates the management program with power-on of the printer 1, and ends the management program with power-off of the printer 1.

The print history storage unit 37 is a nonvolatile memory (a flash memory, an EEPROM, an SRAM with a backup battery, or the like), and stores a management table 41 (refer to FIG. 3) to manage the number of used sheets of each user, the ranking and the like.

As shown in FIG. 3, the management table 41 manages the number of used sheets of paper (corresponding to a recording medium of the present invention) of each user and the ranking of the number of the used sheets on a monthly basis. The management table 41 stores the ranking, a user name, a display name, an E-mail address, an authentication code, the number of used sheets, and a latest use time for each user. The ranking indicates the number of used sheets of each user. The user name indicates an account. The display name is used at the time of displaying an ECO user screen. The E-mail address indicates a notification destination at the time of notifying an ECO user. The authentication code is an identification number assigned to each user. The number of used sheets indicates an accumulated total of the used sheets of paper. The latest user time indicates a date and time when last print processing was performed.

Moreover, in the management table 41, the users are arranged so that the user with the smaller number of used sheets is in a higher place. When there are a plurality of users with the same number of used sheets, the user with the smaller authentication code is arranged in a higher place. When there are a plurality of users with the same number of used sheets, the user with the newer latest time may also be arranged in a higher place.

In the RAM 38, the management table 41 stored in the print history storage unit 37 is developed at the power-on of the printer 1, and the stored management table 41 is updated and overwritten in the print history storage unit 37 at the power-off of the printer 1. The above-described processing is executed by a management program 51.

The scanner signal I/F 34 is connected to the scanner control unit 15, so that the setting information indicating the various setting contents relating to the print processing and the image data are inputted from the scanner control unit 15. Moreover, the scanner signal I/F 34 outputs information for display that is displayed on the display unit 11.

The external I/F 35 is a USB terminal, a network terminal and the like, and is used for connection with external equipment. To the external I/F 35 is connected the information technology equipment 2, so that the setting information indicating the various setting contents relating to the print processing and the image data is inputted from the information technology equipment 2.

The image forming unit I/F 36 is connected to the image forming unit 14 so as to output the setting information and the image data inputted from the scanner I/F 34 or the external I/F 35 to the image forming unit 14. This image data is transferred to the paper as a toner image by the image forming unit 14, based on the setting information.

The information technology equipment 2 includes a CPU 21, an operation unit 22, a storage unit 23, a display unit 24, which is a so-called display, and an external I/F 25 connected to the printer 1. The operation unit 22 receives operation input from the user to output an operation instruction signal to the CPU 21. The CPU 21 controls the storage unit 23, the display unit 24 and the external I/F 25, based on the operation instruction signal inputted from the operation unit 22. In this storage unit 23, various programs (including a printer driver) that the CPU 21 executes are stored, and a notification request program 52 to request notification of the number of used sheets of the user is also stored. This notification request program 52 is executed by the printer driver.

Figure 5:
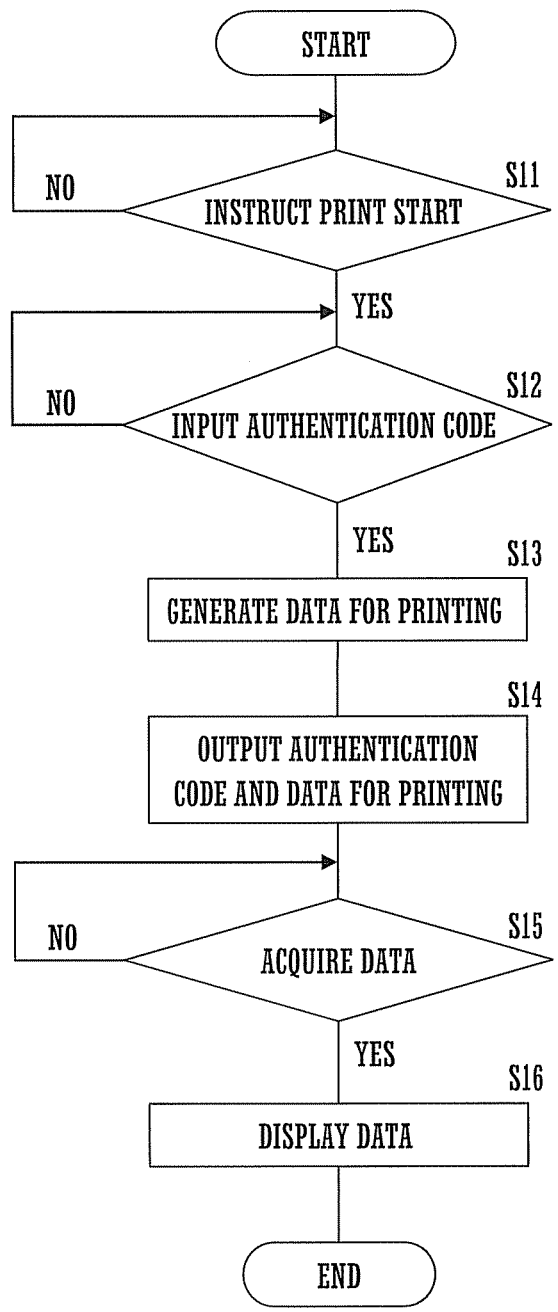
FIG. 5 is a flowchart showing a part of a processing procedure of the information technology equipment.
Figure 6:
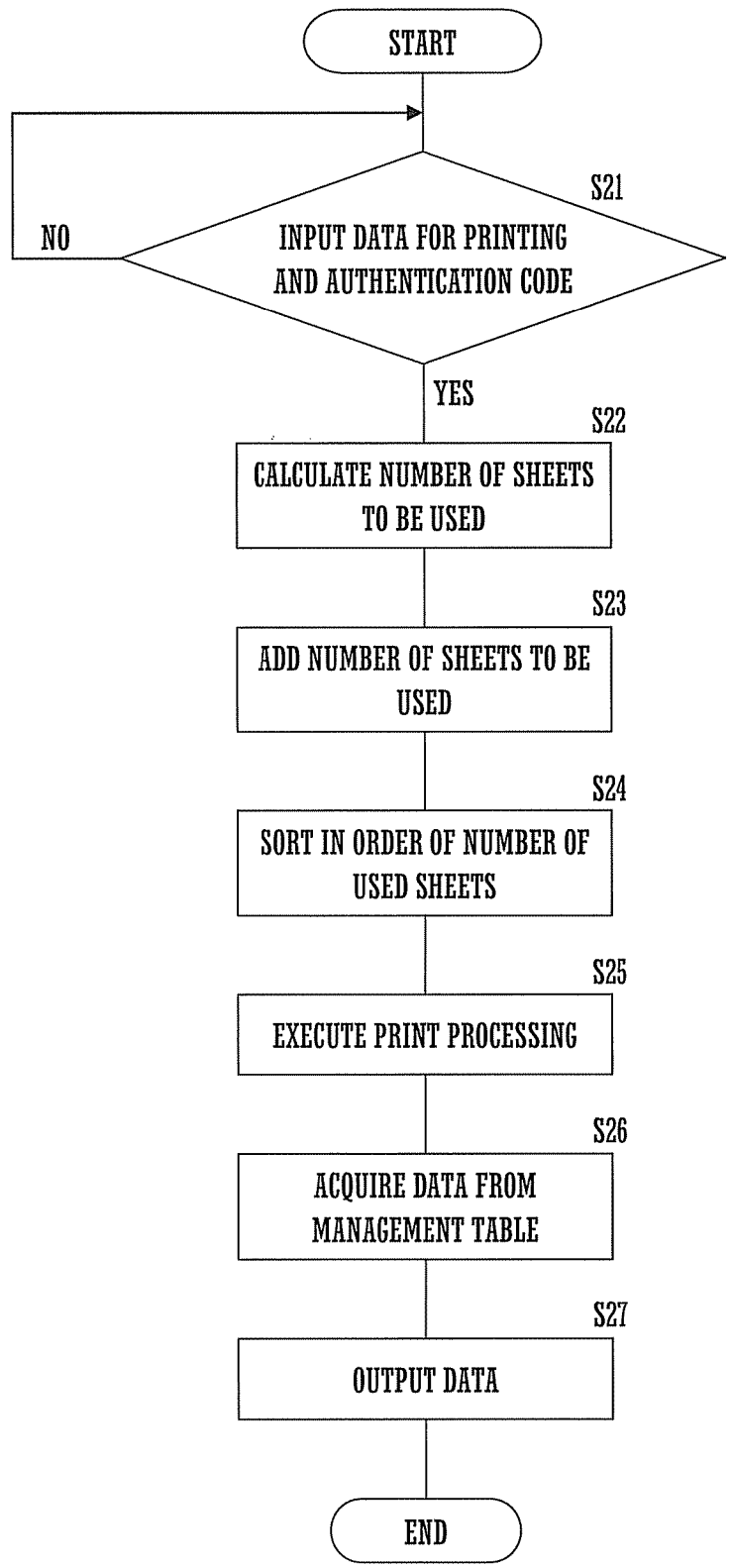
FIG. 6 is a flowchart showing a part of a processing procedure of the image forming apparatus.

First, the print processing using the information technology equipment 2 is described with reference to FIGS. 5 and 6.

Upon receiving a request for the print processing by the user operating the operation unit 22 when an application program (e.g., an editor, a drawing tool or the like) is running, the CPU 21 of the information technology equipment 2 activates the printer driver to display, as an example, a print processing window 61 shown in FIG. 4 on the display unit 24. Upon receiving operation input instructing the start of the print processing (selection of an "OK" button 611) (S11), the CPU 21 executes the notification request program 52 to promote the input of the authentication code, and receives the input of the authentication code (S12). The CPU 21 generates data for printing (S13).

The CPU 21 outputs the authentication code and the data for printing to the printer 1 (S14). That is, the CPU 21 made a print request to the printer 1.

The CPU 21 acquires data for the ECO user screen display (user specification) from the printer 1 (S15), and displays, on the display unit 24, the display name, the ranking, and the number of used sheets of paper of the user instructing the start of the print processing (S16). This data for ECO user screen display (user specification) includes the display name, the ranking, and the number of used sheets of paper of the user corresponding to the authentication code (the authentication code of the user instructing the start of the print processing) the input of which has been received in the processing in S12.

Since the management program 51 is activated, when the data for printing and the authentication code are inputted from the information technology equipment 2 (S21), the CPU 31 of the printer 1 calculates a number of sheets to be used, based on the data for printing (S22). The CPU 31 adds the calculated number of sheets to be used in the management table 41, based on the inputted authentication code (S23). Specifically, the CPU 31 adds the calculated number of sheets to be used to the number of used sheets corresponding to the authentication code matching the inputted authentication code among the authentication codes of the management table 41 developed in the RAM 38.

The CPU 31 rearranges the contents of the management table 41 in the RAM 38 so that the user with the smaller number of used sheets becomes in a higher place (S24). The CPU 31 executes the print processing using the inputted data for printing (S25).

The CPU 31 then acquires the display name, the ranking, the number of used sheets corresponding to the inputted authentication code from the management table 41 in the RAM 38 (S26) and outputs the same to the information technology equipment 2 (S27).

When the management table is updated, while the authentication code the input of which has been received from the user is used as a key, the account of the user may be used as a key. In this case, the information technology equipment 2 receives the input of the account at the time of activation, the input of the authentication code need not be received.

As described above, when the start of the print processing is instructed in the information technology equipment 2, the CPU 31 of the printer 1 adds the number of sheets to be used of paper in the print processing to the management table 41, based on the authentication code, and rearranges the contents of the management table 41 in the order of the smaller number of used sheets. The printer 1 rearranges the contents of the management table 41 in the order of the smaller number of used sheets, by which the ranking of the user is constantly updated to a latest status. As a result, the printer 1 can immediately notify the ranking of the user.

Moreover, after executing the print processing, the information technology equipment 2 displays, on the display unit 24, the ranking of the user starting the print processing, and the number of used sheets of paper of the user. This enables the user to know his or her own ranking in comparison with the other users, thereby being encouraged to reduce the number of sheets to be further used.

In the case where the start of the print processing is instructed in the printer 1 (e.g., when the original is copied), the CPU 31 of the printer 1 promotes the user to operate the operation panel 12 and input the authentication code when the automatic original reading unit 13 scans the original to generate the data for printing. The CPU 31 performs the is processing in S21 to S25, S27 in FIG. 6. The CPU 31 then displays the acquired data on its own display unit 11. In this case, in the processing in S21, the data for printing generated by the automatic original reading unit 13 scanning the original, and the authentication code the input of which has been received are inputted.

This enables the printer 1 to manage not only the number of sheets to be used of paper by the print processing from the information technology equipment 2 but also the number of sheets of paper used during copying, and thus to strictly manage the number of used sheets of paper of each of the users. As a result, the printer 1 can strictly manage the ranking of the respective users.

Next, a case where the printer 1 is operated to notify the user of the ranking and the number of used sheets is described with reference to FIGS. 7 to 9.

Figure 7:
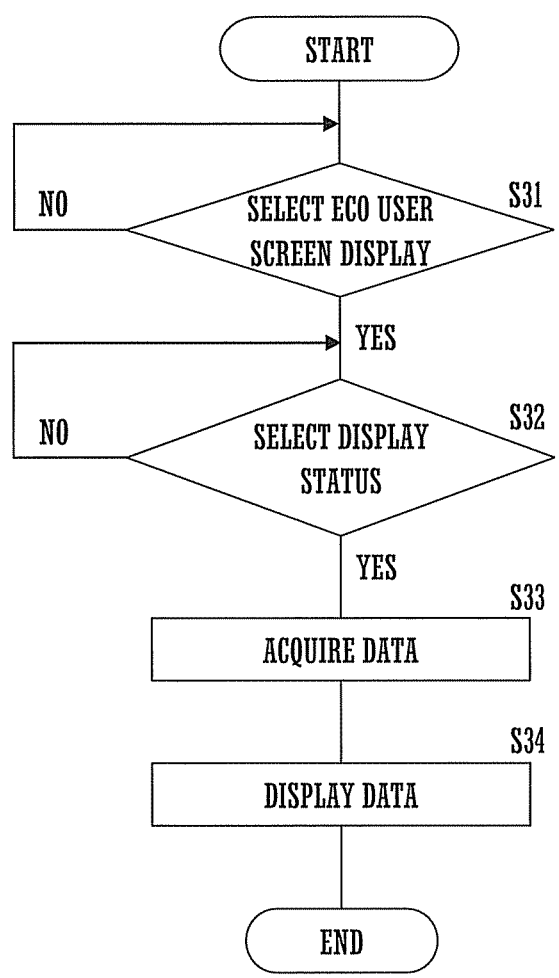
FIG. 7 is a flowchart when ECO user screen display is selected.

As shown in FIG. 7, upon receiving operation input instructing the ECO user screen display (S31), the CPU 31 of the printer 1 promotes the selection of data to be displayed and receives selection operation of data (S32). Specifically, the CPU 31 causes the user to select one of TOP 3 to display the numbers of used sheets by the top three users with the smaller numbers of used sheets of paper, WORST 3 to display the number of used sheets by the top three users with the larger numbers of used sheets of paper, and user specification to display the number of used sheets of the user corresponding to the inputted authentication code. Moreover, when the user specification is selected, the input of the authentication code is also received.

Figure 8:
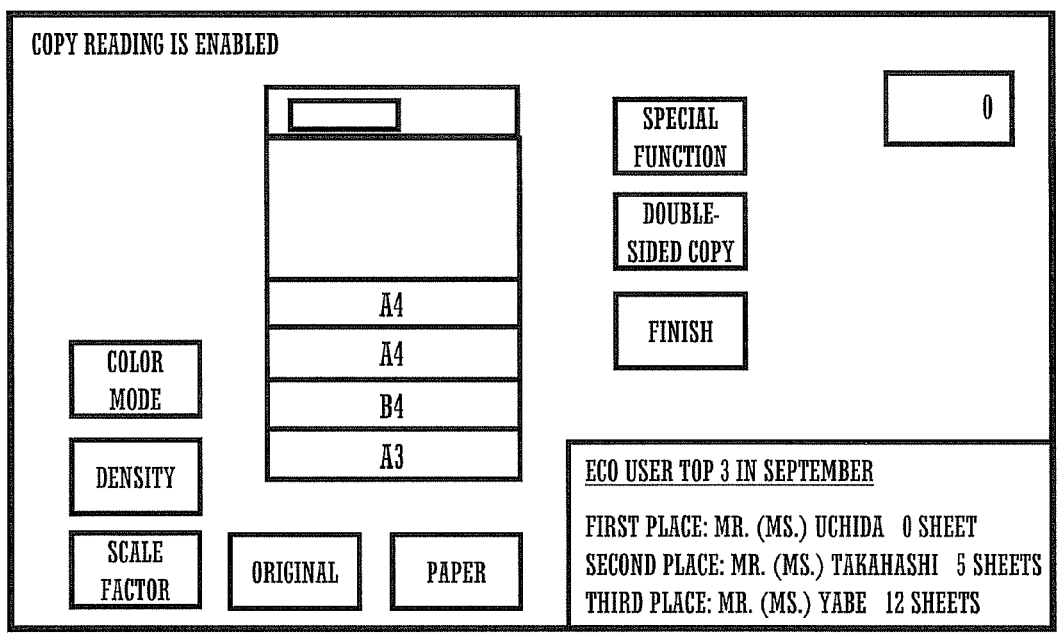
FIG. 8 is a diagram showing one example of a display result is of the ECO user screen display.

The CPU 31 then acquires the selected data from the management table 41 in the RAM 38 (S33) to display on the display unit 11 as shown in FIG. 8 (S34). For example, if the TOP 3 is selected, the CPU 31 acquires and displays the display names and the numbers of used sheets of the users falling into the top three. Moreover, if the user specification is selected, when the authentication code is inputted, the CPU 31 acquires the display name, the ranking and the number of used sheets of the user corresponding to the inputted authentication code to display on the display unit 11.

Figure 9:
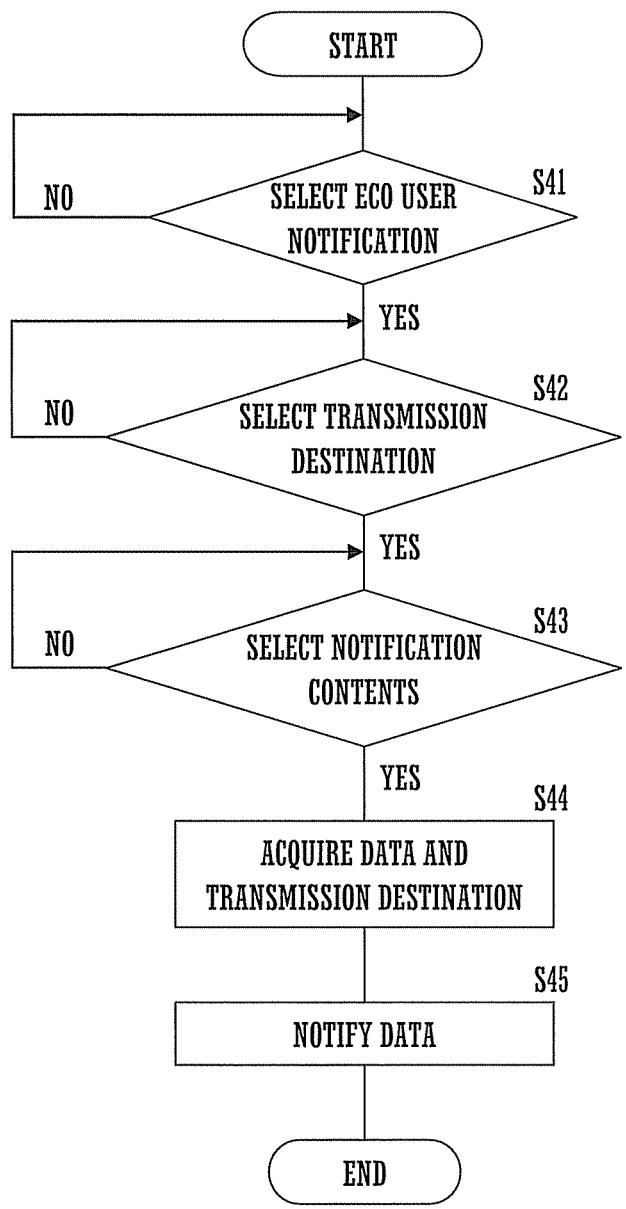
FIG. 9 is a flowchart when ECO user notification is selected.

Moreover, as shown in FIG. 9, upon receiving operation input instructing the ECO user notification (S41), the CPU 31 of the printer 1 receives selection operation of a transmission destination of the user to be notified (S42). The CPU 31 promotes selection of the data to be notified and receives the selection operation of the data (S43). Specifically, the CPU 31 causes the user to select one of the TOP 3 to notify the numbers of used sheets of the top three with the smaller numbers of used sheets of paper, the WORST 3 to notify the numbers of used sheets of the top three with the larger numbers of used sheets of paper, and the user specification to display the number of used sheets of the user corresponding to the inputted transmission destination.

The CPU 31 then acquires the transmission destination and the selected data from the management table 41 in the RAM 38 (S44) and notifies the transmission destination of the acquired data (S45). For example, if the transmission destination and the TOP 3 are selected, the CPU 31 acquires, from the management table 41 shown in FIG. 3, the E-mail address of the transmission destination, and the display names and the numbers of used sheets of the users falling into the top three. The CPU 31 then transmits the display names and the numbers of the used sheets of the respective users to the E-mail address of the transmission destination. Moreover, if the transmission destination and the user specification are selected, the CPU 31 acquires, from the management table 41 shown in FIG. 3, the E-mail address of the transmission destination, the display name, the ranking and the number of used sheets. The CPU 31 then transmits the display name, the ranking and the number of used sheets of the user of the transmission destination to the E-mail address of the transmission destination.

As described above, since the printer 1 notifies the ranking of all the users in accordance with the notification request from the user, the printer 1 can inform the user of a used amount of his or her own in comparison with the other users. As a result, the user can know to what extend the number of used sheets has been reduced in comparison with the other users, and is encouraged to reduce the number of sheets to be further used.

For example, when the user is informed of the TOP 3, he or she can know whether he or she should reduce the paper at this rate or should reduce the paper more in accordance with whether or not he or she is among the TOP 3. Moreover, when the WORST 3 is notified, the user can know whether or not he or she has used the paper too much in comparison with the other users in accordance with whether or not he or she is among the WORST 3.

While in the above-described embodiment, the number of used sheets of the user is notified as well, the number of used sheets may not be notified. The printer 1 can inform the user of his or her own used amount in comparison with the other users without informing the number of used sheets. The printer 1 can more clearly inform the user of his or her own used amount in comparison with the other users by further informing the number of used sheets of the user.

While in the above-described embodiment, the printer 1 calculates the number of sheets to be used for the data for printing, the information technology equipment 2 may calculate the number of sheets to be used and output the calculated number of sheets to be used together with the data for printing and the authentication code. Since this enables the printer 1 to distribute the processing of calculating the number of sheets to be used, thus reducing processing load.

While in the above-described embodiment, the management table 41 manages the number of used sheets of paper of each of the users on a monthly basis, it may manage the number of used sheets of paper of each of the users on a weekly basis, or on a daily basis. Moreover, the management table 41 may manage the number of used sheets on a basis of type of paper, such as a number of used sheets of plain paper, a number of used sheets of backing paper, a number of used sheets of rewritable paper. By managing the numbers of used sheets on a basis of type of paper, it can be determined that a user with a higher usage rate of the backing paper contributes the natural resource saving more.

In the above-described embodiment, the user operates the printer 1 to perform the ECO user notification. However, at predetermined timing (e.g., at the power-on, at the power-off, at 12:00 every day, at 12:00 every Monday, or the like), the ECO user notification may be performed. This enables secure notification to the user.

In the above-described embodiment, the input of the authentication code is not received in the ECO user screen display and the ECO user notification performed by the operation of the printer 1. If the input of the authentication code is received and the authentication code is registered in the management table 41 (if the user is registered), the user may cause the ECO user screen display and the ECO user notification to be performed. This enables the notification to be made only to the specific user.

In the above-described embodiment, in the ECO user notification, after the user selects the transmission destination, the notification is made to the selected transmission destination. However, the input of the authentication code may be received, so that the user of the inputted authentication code may be notified.

In the above-described embodiment, operating the printer 1 causes the printer 1 to perform the ECO user screen display and the ECO user notification. However, the printer 1 may perform the ECO user screen display and the ECO user notification by a request from the information technology equipment 2.

While in the above-described embodiment, the management table 41 is stored in the printer 1, a server device that stores the management table 41 may be provided separately. In this case, for example, after calculating the number of sheets to be used, the information technology equipment 2 outputs the authentication code and the number of sheets to be used to the server device and outputs the data for printing to the printer 1. The server device updates the management table 41 and the printer 1 performs the print processing using the data for printing. Alternatively, for example, the information technology equipment transmits the authentication code and the data for printing to the printer 1. The printer 1 then performs the print processing using the data for printing and calculates the number of sheets to be used of the data for printing to transmit, to the server device, the authentication code and the number of sheets to be used. The server device updates the management table 41.

In this manner, separately providing the server device to manage the management table 41 enables the number of used sheets of each user in the plurality of printers 1. In this case, the server device may receive operation input to itself, and a notification request from the printer 1 and the information technology equipment 2, and may acquire the necessary data from the management table 41 to display on the server device itself, transmit by E-mail, or output to the printer 1 and the information technology equipment 2.

Finally, the description of the above-described embodiment should be considered to be not limitative but illustrative in all points. The scope of the present invention is indicated not by the above-described embodiment but by the scope of claims. Furthermore, the scope of the present invention is intended to include meanings equivalent to the scope of claims and all modifications within the scope.

What is claimed is:

1. An image forming apparatus that is connected to a plurality of information technology equipment, and performs image formation on a recording medium based on data for printing, comprising:

a storing portion for storing a management table that manages identification information of a user, a number of used sheets of the recording medium, and ranking of the number of used sheets of each user in whole users and arranges the users so that the user with a smaller number of used sheets is in a higher place;

a receiving portion for receiving the data for printing and the identification information of the user owning the data for printing from the information technology equipment; a calculating portion for calculating a number of sheets to be used of the recording medium necessary for the image formation based on the data for printing received by the receiving portion;

an updating portion for, whenever the receiving portion receives the data for printing from the information technology equipment, adding the number of sheets to be used calculated by the calculating portion to the number of used sheets of the user corresponding to the identification information received by the receiving portion among the numbers of used sheets by the respective users managed by the management table to update the ranking of the number of used sheets so that the user with a smaller number of used sheets is in a higher place;

a notifying portion for notifying the ranking of the user owning the data for printing so that the user with a smaller number of used sheets is in a higher place, with reference to the management table updated by the updating portion; and a notification request receiving portion for receiving input of a notification request of the ranking of the users, wherein when the notification request receiving portion receives the notification request, the notifying portion notifies the ranking of a part of the users so that the user with a smaller number of used sheets is in a higher place to the user who performed the notification request.

2. The image forming apparatus according to claim 1, further comprising: an input receiving portion for receiving input of the data for printing and the identification information of the user owning the data for printing; and a displaying portion for displaying a progress status of the print processing of the data for printing, wherein the calculating portion calculates the number of sheets to be used necessary for the image formation based on the data for printing the input of which has been received by the input receiving portion, and the notifying portion displays the ranking of the user owning the data for printing on the displaying portion with reference to the management table updated by the updating portion.

3. The image forming apparatus according to claim 2, further comprising a notification request receiving portion for receiving input of a notification request of the ranking of the users, wherein when the notification request receiving portion receives the notification request, the notifying portion notifies the ranking of a part of the users to the user who performed the notification request.

4. The image forming apparatus according to claim 1, wherein the receiving portion receives a notification request of the ranking of the users from the information technology equipment, and when the receiving portion receives the notification request, the notifying portion notifies the ranking of a part of the users to the user who performed the notification request.

5. The image forming apparatus according to claim 2, wherein the receiving portion receives a notification request of the ranking of the users from the information technology equipment, and when the receiving portion receives the notification request, the notifying portion notifies the ranking of a part of the users to the user who performed the notification request.

6. The image forming apparatus according to claim 3, wherein the receiving portion receives a notification request of the ranking of the users from the information technology equipment, and when the receiving portion receives the notification request, the notifying portion notifies the ranking of a part of the users to the user who performed the notification request.

7. An image forming system made up of the image forming apparatus according to claim 1, and information technology equipment that transmits data for printing to the image forming apparatus, wherein the information technology equipment comprises: a print request receiving portion for receiving a print request of the data for printing; a transmitting portion for transmitting, to the image forming apparatus, the data for printing and identification information of a user who performed the print request; and a displaying portion for displaying the notified ranking.

* * * * *